(12) United States Patent
Hotta et al.

(10) Patent No.: US 8,578,587 B2
(45) Date of Patent: Nov. 12, 2013

(54) METHOD OF PRODUCING A WEATHER STRIP

(75) Inventors: Masatoshi Hotta, Aichi-ken (JP); Tamotsu Watanabe, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 48 days.

(21) Appl. No.: 13/137,078

(22) Filed: Jul. 19, 2011

(65) Prior Publication Data

US 2011/0277388 A1 Nov. 17, 2011

Related U.S. Application Data

(62) Division of application No. 11/892,165, filed on Aug. 20, 2007, now abandoned.

(30) Foreign Application Priority Data

Aug. 21, 2006 (JP) ................. P2006-224419

(51) Int. Cl.
*B21B 1/46* (2006.01)

(52) U.S. Cl.
USPC ........................................ 29/527.2

(58) Field of Classification Search
USPC ........................................ 29/527.2
See application file for complete search history.

(56) References Cited

U.S. PATENT DOCUMENTS

| | | | |
|---|---|---|---|
| 4,411,941 A | 10/1983 | Azzola | |
| 4,970,102 A | 11/1990 | Guillon | |
| 5,143,772 A | 9/1992 | Iwasa | |
| 5,153,660 A * | 10/1992 | Goto | ............................ 399/331 |
| 5,157,081 A | 10/1992 | Puydak et al. | |
| 5,511,343 A | 4/1996 | Guillon | |
| 6,110,546 A | 8/2000 | Honda et al. | |
| 6,520,563 B2 | 2/2003 | Nozaki | |
| 6,653,386 B2 | 11/2003 | Graf et al. | |
| 6,686,020 B2 | 2/2004 | Sakuma | |

(Continued)

FOREIGN PATENT DOCUMENTS

| | | |
|---|---|---|
| JP | 59-137229 | 8/1984 |
| JP | 04-059448 | 2/1992 |

(Continued)

OTHER PUBLICATIONS

Japanese Office Action dated Dec. 7, 2010 (not enclosed).

*Primary Examiner* — David Bryant
*Assistant Examiner* — Moshe Wilensky
(74) *Attorney, Agent, or Firm* — McGinn IP Law Group, PLLC

(57) ABSTRACT

A method for producing a weather strip, includes an extrusion step for extruding a non-vulcanized and non-foamed rubber into a predetermined shape, a coating step for coating a treatment liquid containing a simple sulfur, a sulfur compound, or both of the simple sulfur and the sulfur compound on an outer surface of a sealing part of a non-vulcanized and non-foamed intermediate molded body that is molded by the extrusion step, and a vulcanizing and foaming step for forming a skin layer in a non-foamed state by heating and vulcanizing a surface of the treatment liquid, and forming a sponge layer by vulcanizing and foaming the non-vulcanized and non-foamed rubber that is internal from the skin layer by passing the intermediate molded body on which the treatment liquid has been coated during the coating step through a heating zone, the steps being performed when molding the extruded part.

9 Claims, 4 Drawing Sheets

(56) References Cited

U.S. PATENT DOCUMENTS

| | | |
|---|---|---|
| 6,849,310 B2 | 2/2005 | Willett |
| 6,896,954 B2 | 5/2005 | Omori et al. |
| 6,935,072 B2 | 8/2005 | Kogiso et al. |
| 7,097,180 B2 | 8/2006 | Kuzuya et al. |
| 7,252,294 B2 | 8/2007 | Yamada et al. |
| 7,368,074 B2 | 5/2008 | Omori et al. |
| 7,687,133 B2 | 3/2010 | Iwasa et al. |
| 7,718,272 B2 | 5/2010 | Natsuyama et al. |
| 7,744,988 B2 | 6/2010 | Cothran et al. |
| 2001/0003336 A1* | 6/2001 | Abbott et al. .......... 219/543 |
| 2001/0006041 A1* | 7/2001 | Wensel ................ 118/300 |
| 2001/0006187 A1* | 7/2001 | Hasz et al. ............ 228/119 |
| 2001/0008238 A1* | 7/2001 | Witonsky et al. ....... 219/729 |
| 2001/0014409 A1* | 8/2001 | Cohen ................... 428/606 |
| 2001/0036540 A1* | 11/2001 | Pringle et al. .......... 428/202 |
| 2001/0050266 A1* | 12/2001 | Sherrer et al. .......... 216/24 |
| 2003/0051411 A1 | 3/2003 | Nozaki et al. |
| 2004/0088925 A1 | 5/2004 | Nozaki |
| 2004/0227306 A1* | 11/2004 | Kuzuya et al. ......... 277/637 |
| 2005/0080150 A1* | 4/2005 | Nakahama et al. ..... 521/50 |

FOREIGN PATENT DOCUMENTS

| | | |
|---|---|---|
| JP | 09-002072 | 1/1997 |
| JP | 10-52867 | 2/1998 |
| JP | 11-301274 | 11/1999 |
| JP | 2005-139293 | 6/2005 |

* cited by examiner

METHOD OF PRODUCING A WEATHER STRIP

RELATED APPLICATIONS

The present application is a Divisional Application of U.S. patent application Ser. No. 11/892,165 which was filed on Aug. 20, 2007 now abandoned.

BACKGROUND OF THE INVENTION

1. Field of the Invention

This invention relates to a weather strip to be attached to a peripheral part of a door opening of a vehicle and the like as well as to a method for producing the same.

2. Related Art

In general, a weather strip is provided on a peripheral part of a door opening and a peripheral part of a door of a vehicle such as an automobile. The weather strip is provided with an attachment base (a trim part having a section in a substantially U-shape, for example) to be attached to an attachment part (flange, for example) provided on the vehicle door opening peripheral part and the vehicle door opening peripheral part and a sealing part provided as being projected from the attachment base and having a hollow part. When the door is closed, the sealing part is brought into pressure-contact with the door peripheral part, the door opening peripheral part, and the like, so that a seam between the door and the vehicle body is sealed.

The weather strip is molded from a synthetic rubber excellent in weather resistance, such as EPDM (ethylene-propylene-diene copolymer). Almost all of weather strips are made from the above-described rubber material and provided with an extruded part that is molded by conventional extruding methods. The extruded part is obtainable by vulcanizing an intermediate molded body that is extruded from an extruder in a non-vulcanized state.

In general, the sealing part is formed from a sponge material, and a technology of forming a superficial part of the sealing part from a material that is harder than other parts has been known (for example, a solid rubber is used for the superficial part of the sealing part while using a sponge rubber for the other parts). However, it is in fact difficult to uniformly form a thin and wide solid layer made from a solid rubber on the superficial part by extruding. Accordingly, there is a fear that the solid layer is increased in thickness leading to an increase in thickness of the sealing part to result in undesirably large increase in repulsion force (reactive force against the door) of the sealing part.

Also, a technology of irradiating a non-vulcanized and non-foamed intermediate molded body (the attachment base, for example) with an electron beam to crosslink the superficial part of the intermediate molded body in the non-foamed state and then vulcanizing/foaming the rest of parts in molding the weather strip (extruded part) having the sponge rubber part has been known (see JP-A-10-52867, for example). By employing the technology, it is possible to form the solid layer on the superficial part of the sponge rubber part, thereby enhancing durability and the like of the sponge rubber part.

Though it is possible to achieve the solid layer thinner than that obtained by the simultaneous formation of the solid layer by employing the technology disclosed in JP-A-10-52867, the technology is not yet satisfactory since there is a fear for inviting the increase in reactive force in the case of the above-described sealing part.

Further, with the technology disclosed in JP-A-10-52867, there is a fear that, even when only the sealing part is irradiated with the electron beam with a region (trim part, etc.) except for the sealing part is being masked, the masked part such as a peripheral portion of the sealing part, for example, can be crosslinked in addition to the sealing part. More specifically, since it is difficult to properly define the part to be hardened by the electron beam irradiation, there is a fear that the parts that do not require the increase in rigidity can be increased in rigidity. Also, since an apparatus for the electron beam irradiation is required, an equipment cost can be remarkably increased.

SUMMARY OF THE INVENTION

This invention has been accomplished in order to solve the above-described problems, and an object thereof is to provide a weather strip capable of enhancing durability of a sealing part as well as of suppressing the troubles caused by the too large reactive force.

Hereinafter, measures suitable for attaining the above object and the like will be described as being itemized. Specific effects and the like of each of the measures will be described together with the measure when so required.

Item 1. A weather strip comprising a sealing part provided along a peripheral part of a door of a vehicle or a peripheral part of a door opening of a vehicle and having a hollow part, the sealing part comprising an extruded part that is brought into contact with the door opening peripheral part or the door peripheral part when the door is closed, wherein the extruded part comprises a sponge layer and a skin layer that is formed on a superficial part of an outer surface of the sealing part and harder than the sponge layer; and the skin layer includes a contact part that is brought into contact with a mating member and has a width of 10 mm or more in a direction of a width of the extruded part and a uniform thickness set in a range of 0.04 mm to 0.15 nut.

According to Item 1, the skin layer harder than the sponge layer is formed on the superficial part of the sealing part outer surface. Therefore, it is possible to enhance durability and abrasion resistance of the sealing part. Also, the skin layer has the width of 10 mm or more and the uniform thickness of from 0.04 mm or more to 0.15 mm or less. Therefore, it is possible to prevent the fear that a repulsion force (a reactive force for repelling the door) of the sealing part is increased too much. Accordingly, it is possible to achieve the enhancement of durability and abrasion resistance of the sealing part as well as to suppress the possibility of requiring a relatively large force for closing the door tightly due to repulsion of the sealing part when closing the door.

Also, by forming the skin layer on the outer surface of the sealing part that is exposed when the door is opened, it is possible to form the smooth outer surface. Therefore, it is possible to prevent the probability that appearance quality is deteriorated when the sponge layer which is subject to unevenness due to influence of bubbles is exposed to the outer surface.

In the case where the thickness of the skin layer is less than 0.04 mm, the effect of enhancing the durability of the sealing part becomes insufficient, and there is a fear that a sealing part property can be diminished. Also, when the thickness of the skin layer exceeds 0.15 mm, there is a fear that the sealing part bounces back when the door is closed to require a relatively large force for closing the door tightly. As used herein, the mating member means the vehicle door peripheral part when the weather strip is provided on a vehicle door opening peripheral part and means a vehicle door opening peripheral part when the weather strip is provided on the vehicle door peripheral part.

Item 2. A weather strip comprising a trim part to be attached to an attachment part provided along a peripheral part of a door opening of a vehicle and having a substantially U-shaped sectional shape and a sealing part provided as being projected from the trim part and having a hollow part, the sealing part comprising an extruded part that is brought into contact with a peripheral part of the door when the door is closed, wherein the extruded part comprises a sponge layer and a skin layer that is formed on a superficial part of an outer surface of the sealing part and harder than the sponge layer; and the skin layer includes a contact part that is brought into contact with the door peripheral part and has a width of 10 mm or more in a direction of a width of the extruded part and a uniform thickness set in the range of 0.04 mm to 0.15 mm.

According to Item 2, effects same as those of Item 1 are achieved.

Item 3. A method for producing the weather strip defined in Item 1 or 2, comprising:

an extrusion step for extruding a non-vulcanized and non-foamed rubber into a predetermined shape;

a coating step for coating a treatment liquid containing a simple sulfur, a sulfur compound, or both of the simple sulfur and the sulfur compound on the outer surface of the sealing part of the non-vulcanized and non-foamed intermediate molded body that is molded by the extrusion step; and a vulcanizing and foaming step for forming the skin layer in a non-foamed state by heating and vulcanizing a surface of the treatment liquid coating and forming the sponge layer by vulcanizing and foaming the non-vulcanized and non-foamed rubber material that is internal from the skin layer by passing the intermediate molded body on which the treatment liquid has been coated during the coating step through a heating zone, the steps being performed when molding the extruded part.

According to Item 3, after the extrusion step and before the vulcanizing and foaming step, the treatment liquid containing the simple sulfur, the sulfur compound, or both of the simple sulfur and sulfur compound is coated on the outer surface of the sealing part (part to be used as the sealing part) of the non-vulcanized and non-foamed intermediate molded body. Therefore, a sulfur concentration of a superficial part of the sealing part on which the treatment liquid is coated becomes higher than that of other parts, and a crosslinking reaction of the superficial part of the sealing part is promoted as compared to other parts in the subsequent vulcanizing and foaming step. Also, the superficial part of the sealing part on which the treatment liquid is coated is suppressed in foaming due to the promoted crosslinking reaction. Due to these effects, the skin layer harder than the other part (sponge layer) is formed on the superficial part of the sealing part of the vulcanized and foamed intermediate molded body, on which the treatment liquid is coated. Consequently, durability and abrasion resistance of the sealing part are reliably enhanced.

Further, by forming the skin layer by promoting the crosslinking reaction by coating the treatment liquid, it is possible to uniformly form the thin and wide (10 mm or more) skin layer as described in Items 1 and 2. Therefore, it is possible to reliably prevent the possibility of too much repulsion force of the sealing part that can be caused by an increase in thickness of the skin layer, i.e. of the sealing part. Thus, it is possible to suppress the possibility of requiring a relatively large force for closing the door tightly due to repulsion of the sealing part when closing the door.

Also, according to Item 3, the skin layer having the predetermined thickness is formed on the superficial part of the part on which the treatment liquid is coated. In other words, the skin layer having the predetermined thickness is not formed on the part on which the treatment liquid is not coated. Accordingly, it is possible to reliably define a boundary between the part on which the skin layer having the predetermined thickness is formed and the part on which the skin layer having the predetermined thickness is not formed. Therefore, it is possible to easily form the skin layer having the predetermined thickness on any part which requires an increase in rigidity. As a result, it is possible to achieve a designed hardness of each of the parts of the weather strip.

Also, since the thickness of the sealing part in the case where the treatment liquid is coated on the sealing part and the thickness of the sealing part in the case where the treatment liquid is not coated on the sealing part do not differ greatly from each other, it is possible to avoid a case of design alteration and the like that can be caused by an increase in lapping amount of a door frame and the like. Further, since it is possible to mold at least the sealing part by extruding a single material from the extruder, it is possible to avoid using a complicated and large extruder for molding the extruded part as compared to the case where the material to be used for the superficial part of the sealing part and the material to be used for the parts other than the superficial part are different from each other.

Note that meanings of "extruding into a predetermined shape" include "extruding into a shape having a sectional shape having the sealing part" and "extruding into a shape having a sectional shape having the trim part and the sealing part".

Item 4. The weather strip production method according to Item 3, wherein the coating step is performed by using a spraying unit for spraying the treatment liquid at least on the outer surface of the sealing part of the intermediate molded body, and a masking unit for covering parts other than the sealing part of the intermediate molded body.

According to Item 4, the treatment liquid is coated on the intermediate molded body by spraying the treatment liquid from the spraying unit. Since it is possible to substantially uniformly coat the treatment liquid over the outer surface of the sealing part of the intermediate molded body, on which the skin layer is to be formed, it is possible to reliably form the skin layer.

Item 5. The weather strip production method according to Item 4, wherein the masking unit is a wall part disposed between the parts other than the sealing part of the intermediate molded body and the spraying unit so that the parts other than the sealing part and the spraying unit are shielded from each other.

For example, in the case of employing a masking method wherein: an adhesive tape or the like is used as a masking means; the adhesive tape or the like is adhered to the part of the intermediate molded body that does not require the skin layer having the predetermined thickness; and the adhesive tape or the like is removed after coating the treatment liquid on the intermediate molded body, the step of adhering the adhesive tape or the like and the step of removing the adhesive tape or the like are required, thereby inviting a reduction in work efficiency. From this point of view, it is possible to prevent the probability of inviting the reduction of work efficiency according to Item 5, since Item 5 does not require such steps.

DETAILED DESCRIPTION OF THE PREFERRED EMBODIMENTS

Figure 1:
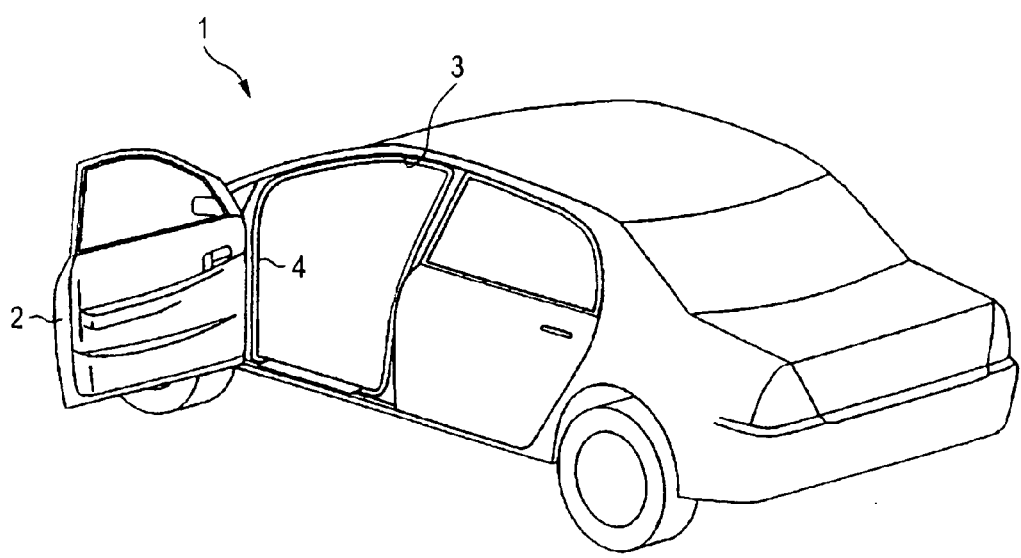
FIG. 1 is a perspective view showing an automobile of which a front door is opened.

Hereinafter, one embodiment will be described with reference to drawings. As shown in FIG. 1, an automobile 1 as a vehicle is provided with a vehicle door (front door in FIG. 1, and hereinafter simply referred to as door 2) which is capable of opening and closing, and a weather strip 4 is attached to a peripheral part of a door opening 3 of a vehicle body (vehicle main body) corresponding to the door 2. The weather strip 4 of this embodiment is molded by an extruding method and has a substantially ring-like shape as a whole. In other words, substantially whole part of the weather strip 4 forms an extruded part.

Figure 2:
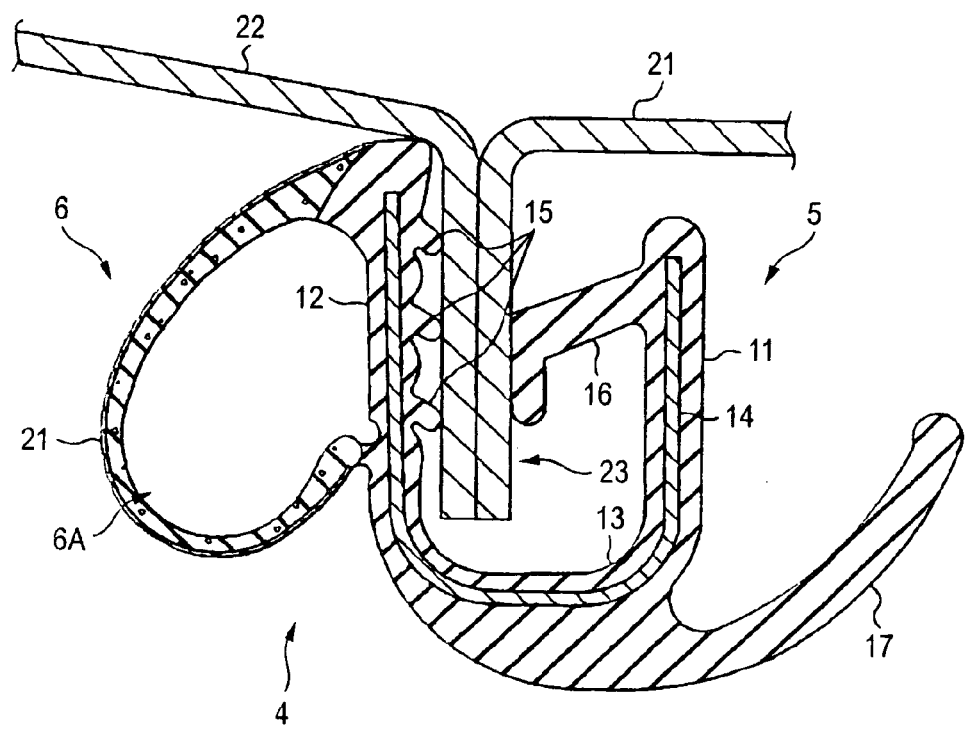
FIG. 2 is a sectional view showing a weather strip.

As shown in FIG. 2, the weather strip 4 is provided with a trim part 5 and a sealing part 6. The trim part 5 is provided with a connection part 13 for connecting a vehicle interior side wall 11, a vehicle exterior side wall 12, and both of the walls 11 and 12 and has a substantially U-shaped sectional shape as a whole. The trim part 5 is formed from a solid EPDM (ethylene-propylene-diene copolymer rubber). An insert 14 made from a metal is embedded in the trim part 5. A lip part 17 for covering an edge of an interior member such as a garnish (not shown) is formed integrally with the connection part 13.

A plurality of holding lip parts 15 extending to an inner side (vehicle interior side) of the trim part 5 are formed integrally with an inner surface (vehicle interior side) of the vehicle exterior side wall 12, and a holding lip 16 extending to an inner side (vehicle exterior side) of the trim part 5 is formed integrally with an inner surface (vehicle exterior side) of the vehicle interior side wall 11.

An inner panel 21 and an outer panel 22 of the vehicle body are joined to form a flange 23 serving as an attachment part on the peripheral part of the door opening 3. When the trim part 5 is fitted into the flange 23, the weather strip 4 is attached to the peripheral part of the door opening 3. The attachment state of the weather strip 4 is basically maintained by flexibility and the like of the holding lips 15 and 16.

The sealing part 6 is projected from the vehicle exterior side wall 12 toward the outside of the vehicle and has a hollow part 6a inside thereof. When the door 2 is closed, the sealing part 6 is deformed when contacting or pressure-contacting with the peripheral part of the door 2, so that a seam between the door 2 and the vehicle body is sealed. A large part of the sealing part 6 is basically formed from a foamed EPDM.

In this embodiment, a skin layer 21 that is harder than other parts (such as inner part in the form of a sponge) is formed on a superficial part of an outer surface of the sealing part 6. The skin layer 21 includes the part contacting at least with the door 2 and the part of the sealing 6 deformed when the door 2 is closed and has a width of 10 mm or more in a direction of a width of the extruded part. In this embodiment, the skin layer 21 is formed on a substantially whole region of the outer surface of the sealing part 6. Further, a thickness of the skin layer 21 is substantially uniform at any parts thereof and set to a value ranging from 40 μm to 150 μm in this embodiment. That is, since the sealing part 6 is deformed at the part contacting the door 2 and in the vicinity of the contacting part when the door 2 is closed, the width of the skin layer 21 is set to 10 mm or more in order to keep a uniform door closing force.

By providing the skin layer 21 that is harder than the sponge layer on a superficial layer of the sealing part 6, unevenness of the surface to be caused by foaming is suppressed, and a smooth surface (surface roughness is 20 μm (Rz) in this example) is formed. In this embodiment, the part other than the skin layer 21 of the sealing part 6 forms the sponge layer. The skin layer 21 is not formed on the trim part 5 and the lip part 17.

Figure 3:
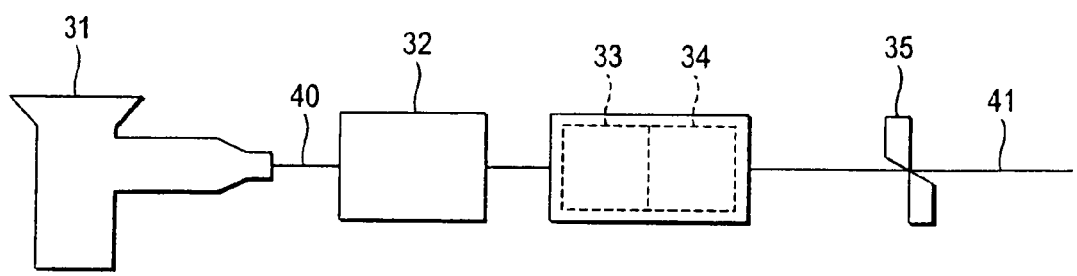
FIG. 3 is a schematic diagram showing a part of a production line of the extruded body.

Hereinafter, a production method for the weather strip 4 will be described. FIG. 3 is a schematic diagram showing a part of a production line of an extruded material 41, and a work to be used as the weather strip 4 is produced as proceeding from the left to the right in FIG. 3.

In an extrusion step, a non-vulcanized EPDM is continuously supplied to the extruder 31. An intermediate molded body 40 having a predetermined sectional shape is extruded from a dice of the extruder 31. A part corresponding to the trim part 5 has a substantially flat shape in order that the part is firstly extruded in an opened state (curved afterwards), and the non-vulcanized EPDM and the insert 14 are continuously supplied to the part. The non-vulcanized EPDM for a part (hereinafter simply referred to as sealing part 6) corresponding to the sealing part 6 contains a simple sulfur, a sulfur compound, or the simple sulfur and the sulfur compound as a crosslinking agent as well as a foaming material such as sodium bicarbonate.

Subsequently to the extrusion step, the extruded intermediate molded body 40 is guided to a surface treatment tank 32, so that a coating step for coating a crosslinking sulfur dispersion liquid containing the simple sulfur, the sulfur compound, or both of the simple sulfur and the sulfur compound and serving as a treatment liquid on the outer surface of the sealing part 6. In this embodiment, 100 wt % of the crosslinking sulfur dispersion liquid contains 1 to 50 wt % of the simple sulfur and/or the sulfur compound, 0.01 to 25 wt % of a surfactant serving as a dispersant, 0 to 1 wt % of a stabilizer such as polyvinyl alcohol, and 24 to 98.99 wt % of a dispersion medium such as water. As the simple sulfur and the sulfur compound, it is desirable to use particles capable of passing through a sieve of ordinarily 300-mesh, preferably 500-mesh. Usable as the dispersion medium include those do not react with the simple sulfur, the sulfur compound, and the non-vulcanized rubber which is to be subjected to the crosslinking and capable of dissolving or dispersing the dispersant and the stabilizer.

Figure 4:
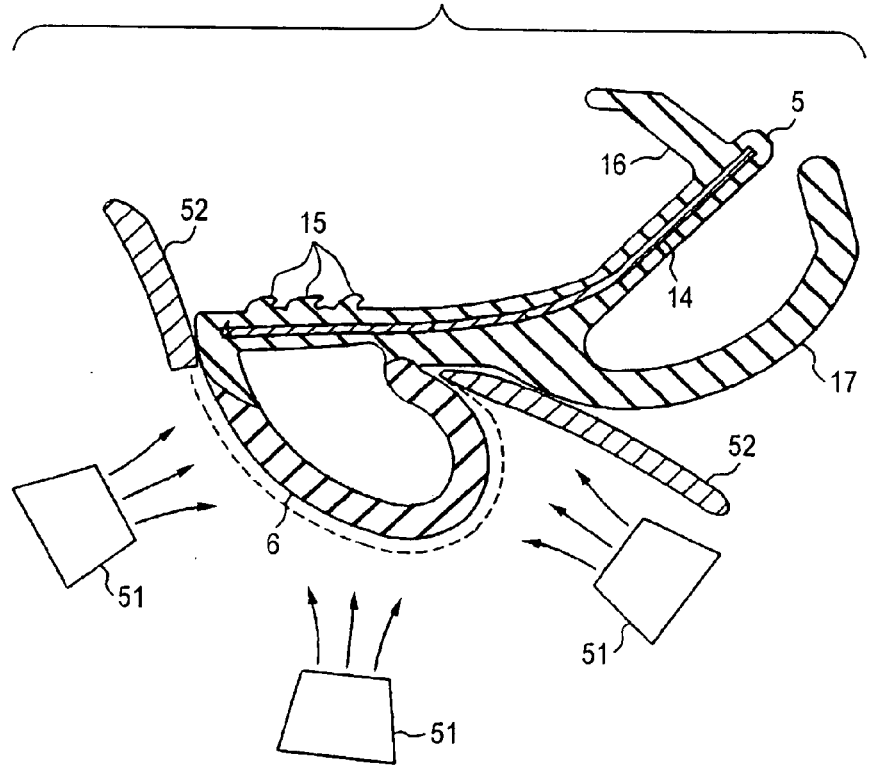
FIG. 4 is a schematic sectional view showing an internal structure of a surface treatment tank.

As shown in FIG. 4, the surface treatment tank 32 is provided with a spraying device provided with a plurality of nozzles 51 for spraying the crosslinking sulfur dispersion liquid and a shielding wall 52 for shielding the parts (trim part 5 and lip part 17 in this example) of the intermediate molded body 40, which do not require the skin layer 21 having the predetermined thickness, and the nozzles 51 from each other in order to prevent adhesion of the crosslinking sulfur dispersion liquid sprayed from the nozzles 51 to the parts, the nozzles 51 and the shielding wall 52 being provided inside the surface treatment tank 32. During the intermediate molded body 40 is passing through the surface treatment tank 32, the crosslinking sulfur dispersion liquid sprayed from the nozzles 51 is coated on the part that is not masked by the shielding wall 52, i.e. on the outer surface of the sealing part 6. A small amount of the crosslinking sulfur dispersion liquid coated on the outer surface of the sealing part 6 permeates into the inner part of the intermediate molded body 40, thereby increasing a sulfur concentration of the superficial part of the sealing part 6 on which the crosslinking sulfur dispersion liquid is coated. In this embodiment, the spraying device provided with the plural nozzles 51 forms the spraying unit, and the shielding wall 52 forms the masking unit.

In a subsequent crosslinking/foaming step, the intermediate molded body 40 is guided to a high frequency vulcanizing tank (UHF) 33 and a hot air vulcanizing tank (HAV) 34 for vulcanization/foaming.

Since the crosslinking sulfur dispersion liquid is coated on the outer surface of the sealing part 6 in the coating step in this embodiment, the superficial part of the sealing part 6 on which the crosslinking sulfur dispersion liquid is coated has the sulfur concentration that is higher than the other part. Therefore, a crosslinking reaction on the superficial part of the sealing part 6 is promoted as compared to the other part in the vulcanizing/foaming step. The superficial part of the sealing part 6 is suppressed in foaming due to the promoted crosslinking reaction. Due to these effects, the skin layer 21 that is harder than the other part is formed on the superficial part of the vulcanized/foamed sealing part 6. A part corresponding to the trim part 5 is not foamed since that part does not contain the foaming material, and only the crosslinking reaction occurs in the part.

After that, the intermediate molded body 40 is cut into a predetermined size by using a cutter 35, and then the intermediate molded body 40 is folded into a predetermined shape to connect opposite ends thereof, thereby obtaining the weather strip 4.

It is possible to control the thickness of the skin layer 21 by changing a coating amount (coating period) of the crosslinking sulfur dispersion liquid sprayed from the nozzles 51 or by increasing the sulfur concentration of the crosslinking sulfur dispersion liquid. Also, an amount of sulfur present on the outer surface of the sealing part 6 is in the range of values of from 1.2 times to 10 times as large as the sulfur existing on a cut surface obtained when cutting the sealing part 6 to a depth of 1 mm from the outer surface in a vertical direction.

As described in detail in the foregoing, the skin layer 21 that is harder than the sponge layer is formed by coating the crosslinking sulfur dispersion liquid on the outer surface of the sealing part 6 after the extrusion step and before the crosslinking/foaming step in this embodiment. Therefore, it is possible to enhance the durability and abrasion resistance of the sealing part 6. Also, the skin layer 21 has the uniform thickness of from 0.04 mm to 0.15 mm. Therefore, it is possible to prevent the probability that a repulsion force (force for repelling the door 2) of the sealing part 6 becomes too large. Consequently, it is possible to achieve the enhancement of durability and abrasion resistance of the sealing part 6 while suppressing the probability of requiring a relatively large force for closing the door 2 tightly due to the repulsion of the sealing part 6 when closing the door 2.

Also, by forming the skin layer 21 on the outer surface of the sealing part 6 that is exposed when the door 2 is opened, it is possible to form the smooth outer surface. Therefore, it is possible to prevent the probability that appearance quality is deteriorated when the sponge layer which tends to be in an uneven shape due to influence of the bubbles is exposed to the outer surface. Though the surface roughness in this embodiment is 20 μm (Rz), it is possible to adjust the surface roughness to 10 to 30 μm (Rz).

Further, it is possible to form the thin and uniform skin layer 21 having the width of 10 mm or more in a direction of the weather strip 4 (extruded part) by promoting the crosslinking reaction by coating the crosslinking sulfur dispersion liquid. Therefore, unlike the case of two color simultaneous extruding, it is possible to form the thin and uniform skin layer 21 in the wide range in the width direction, thereby reliably preventing the probability that the repulsion force of the sealing part 6 is increased too much. Therefore, it is possible to suppress the probability of requiring a relatively large force for tightly closing the door 2 due to the repulsion force of the sealing part 6 when closing the door 2.

According to this embodiment, the skin layer 21 having the predetermined thickness is formed only on the superficial part of the part on which the crosslinking sulfur dispersion liquid is coated. In other words, the skin layer 21 having the predetermined thickness is not formed on the part on which the treatment liquid is not coated. Accordingly, it is possible to reliably define the part on which the skin layer 21 having the predetermined thickness is to be formed. Therefore, it is possible to avoid defects caused by formation of the skin layer 21 having the predetermined thickness on the part that does not require the skin layer 21 having the predetermined thickness, such as the part that does not require the increase in rigidity. As a result, it is possible to achieve a designed hardness of each of the parts of the weather strip 4.

Also, since the thickness of the sealing part 6 in the case where the crosslinking sulfur dispersion liquid is coated on the sealing part 6 and the thickness of the sealing part 6 in the case where the crosslinking sulfur dispersion liquid is not coated on the sealing part 6 do not differ greatly from each other, it is possible to avoid design alteration and the like due to the formation of the skin layer 6, such as a reduction in length of the projection of the sealing part 6 from the trim part 5. Further, since it is possible to mold at least the sealing part 6 by extruding a single material from the extruder, it is possible to avoid using a complicated and large extruder for molding the weather strip 4 as compared to the case where the material to be used for the superficial part of the sealing part 6 and the material used for the part other than the superficial part are different from each other. Also, it is possible to suppress an increase in equipment cost as compared to the case of forming the skin layer by irradiating a predetermined part with an electron beam.

The crosslinking sulfur dispersion liquid is coated on the intermediate molded body 40 by spraying the crosslinking sulfur dispersion liquid from the nozzles 51. Therefore, it is possible to substantially uniformly coat the treatment liquid on the wide range of the outer surface of the sealing part 6, thereby making it possible to reliably form the skin layer 21. Further, by the shielding wall 52, it is possible to prevent the probability that the crosslinking sulfur dispersion liquid is coated on (adhered to) the part other than the sealing part 6 among the intermediate molded body that does not require the skin layer 21.

Also, in the case of employing a masking method of adhering an adhesive tape or the like to the part of the intermediate molded body 40 that does not require the skin layer 21 and removing the adhesive tape or the like after coating the crosslinking sulfur dispersion liquid on the intermediate molded body, the step of adhering the adhesive tape or the like and the step of removing the adhesive tape or the like are required, thereby inviting a reduction in work efficiency. From this point of view, it is possible to prevent the probability of inviting the reduction of work efficiency according to this embodiment, since this embodiment does not require such steps.

It is possible to put this invention into practice as described below, for example, without limitation to the description of the foregoing embodiment. Of course, other application examples and modification examples that are not described below are possible, too.

(a) Though the specific example of the weather strip 4 to be provided on the door opening peripheral part on the vehicle body side which corresponds to the door 2 at the front has been described in the foregoing embodiment, it is possible to apply this invention to weather strips to be provided on door opening peripheral parts corresponding to other doors such as a rear door, a back door, a luggage door (trunk lid), and a roof door (sliding roof panel). Also, it is possible to apply this invention to a weather strips to be provided on peripheral parts of the doors.

(b) In the foregoing embodiment, in order to prevent adherence of the crosslinking sulfur dispersion liquid sprayed from the nozzles 51 to the parts (trim part 5 and lip part 17) other than the sealing part 6 of the intermediate molded body 40, which do not require the skin layer 21, the shielding wall 52 for shielding the parts and the nozzle 51 from each other is provided for the purpose of masking. However, the masking is not particularly limited to such structure. For example, a method wherein an adhesive tape or the like is adhered to the parts of the intermediate molded body 40, which do not require the skin layer 21, for masking, and then the adhesive tape or the like is removed after the crosslinking sulfur dispersion liquid coating may be employed. In this case, since the step of adhering the adhesive tape or the like to the trim part 5 and the like and the step of removing the adhesive tape or the like are required, it is possible to invite a reduction in productivity. Therefore, it is desirable to employ the masking method wherein the shielding part (shielding wall 52) is placed between the parts that do not require the skin layer 21 and the nozzles 51 for shielding the parts and the nozzles 51 from each other.

(c) In the foregoing embodiment, the crosslinking sulfur dispersion liquid is coated on the intermediate molded body 40 by spraying the crosslinking sulfur dispersion liquid from the nozzles 51. However, the crosslinking sulfur dispersion liquid may be sprayed on the intermediate molded body 40 by using a brush, a roller, or the like. Note that the spray coating which is the non-contact method as described above is preferred in view of the fact that the shape of the intermediate molded body 40 is not stable since it is non-vulcanized.

Though the crosslinking sulfur dispersion liquid is sprayed at once on the whole region of the outer surface of the sealing part 6 in FIG. 4, the plural nozzles 51 may be shifted in a direction of transfer of the intermediate molded body 40 so as to prevent interference among droplets sprayed from the nozzles 51. Also, the shielding wall 52 may be disposed appropriately in accordance with the shift of the plural nozzles 51.

(d) Though the sealing part 6 is formed from the foamed EPDM in the foregoing embodiment, the sealing part 6 may be formed from other foamed rubbers. Also, though the trim part 5 is formed from the solid EPDM in the foregoing embodiment, the trim part 5 may be formed from other materials.

(e) Though the weather strip 4 is provided on the entire circumference of the peripheral part of the door opening 3, the weather strip 4 may be provided on a substantially entire circumference except for a lower part of the peripheral part of the door opening 3 or may be provided partially. Also, this invention is applicable to an extruded part of a weather strip that is formed as being connected in a die. In addition, this invention is applicable to a weather strip that does not have the insert 14.

What is claimed is:

1. A method for producing a weather strip, the method comprising:

an extrusion step for extruding a non-vulcanized and non-foamed rubber into a predetermined shape;

a coating step for coating a treatment liquid containing a simple sulfur, a sulfur compound, or both of the simple sulfur and the sulfur compound on an outer surface of a sealing part of a non-vulcanized and non-foamed intermediate molded body that is molded by the extrusion step; and a vulcanizing and foaming step for forming a skin layer in a non-foamed state by heating and vulcanizing a surface of the treatment liquid, and forming a sponge layer by vulcanizing and foaming the non-vulcanized and non-foamed rubber that is internal from the skin layer by passing the intermediate molded body on which the treatment liquid has been coated during the coating step through a heating zone, the steps being performed when molding an extruded part, wherein the coating step is performed by using:
 a spraying unit for spraying the treatment liquid at least on the outer surface of the sealing part of the intermediate molded body; and
 a masking unit for covering parts other than the sealing part of the intermediate molded body, wherein the extruded part includes:
 the sponge layer; and
 the skin layer that is formed on an outer surface of the sponge layer, the sponge layer and the skin layer comprising the same rubber with different sulfur concentrations, such that the skin layer has a hardness which is greater than a hardness of the sponge layer, wherein the skin layer is formed by uniformly applying the treatment liquid and includes a contact part for contacting a mating member and has a width of 10 mm or more in a direction of a width of the extruded part and a uniform thickness set in a range of 0.04 mm to 0.15 mm, and wherein the masking unit comprises a wall part disposed between parts other than the sealing part of the intermediate molded body and the spraying unit so that the parts other than the sealing part and the spraying unit are shielded from each other.

2. The weather strip production method according to claim 1, wherein the weather strip comprises the sealing part.

3. The weather strip production method according to claim 2, wherein the sealing part includes a hollow part, and the extruded part is formed around the hollow part, the extruded part comprising a vulcanized rubber part.

4. The weather strip production method according to claim 3, wherein the vulcanized rubber part includes the sponge layer and the skin layer.

5. A method of molding an extruded part for a weather strip, the method comprising:

extruding a non-vulcanized and non-foamed rubber into a predetermined shape to form an intermediate molded body comprising a sealing part;

coating a treatment liquid comprising sulfur on an outer surface of the sealing part, the coating of the treatment liquid comprising covering a part of the intermediate molded body which is other than the sealing part by using a masking unit; and forming a skin layer in a non-foamed state by heating and vulcanizing a surface of the treatment liquid, and forming a sponge layer by vulcanizing and foaming the non-vulcanized and non-foamed rubber that is internal from the skin layer by passing the intermediate molded body through a heating zone, wherein the skin layer comprises a uniform thickness in a range from 0.04 mm to 0.15 mm, wherein the coating of the treatment liquid further comprises spraying the treatment liquid on the outer surface of the sealing part of the intermediate molded body, during the covering of the part of the intermediate molded body by the masking unit, wherein the spraying of the treatment liquid comprises uniformly applying the treatment liquid on the outer surface of the sealing part by using a spraying unit, wherein the spraying unit comprises a nozzle, the treatment liquid being sprayed from the nozzle, wherein the intermediate molded body comprises a lip part, and wherein the masking unit comprises wall part which is formed between lip art and the nozzle and inhibits the treatment liquid sprayed from the nozzle from contacting the lip part.

6. The method of claim 5, wherein the extruded part includes:
the sponge layer; and
the skin layer that is formed on an outer surface of the sponge layer, the sponge layer and the skin layer comprising the same rubber with different sulfur concentrations, such that the skin layer has a hardness which is greater than a hardness of the sponge layer.

7. The method of claim 5, wherein the skin layer is formed by uniformly applying the treatment liquid and includes a contact part for contacting a mating member and has a width of 10 mm or more in a direction of a width of the extruded part and a uniform thickness set in a range of 0.04 mm to 0.15 mm.

8. The method of claim 5, wherein the sulfur comprises at least one of a simple sulfur and a sulfur compound.

9. A method of molding an extruded part for a weather strip, the method comprising:
extruding a non-vulcanized and non-foamed rubber into a predetermined shape to form an intermediate molded body comprising a sealing part;
coating a treatment liquid comprising sulfur on an outer surface of the sealing part, the coating of the treatment liquid comprising:
spraying the treatment liquid at least on the outer surface of the sealing part of the intermediate molded body, by using a spraying unit; and
during the spraying of the treatment liquid, covering a part of the intermediate molded body which is other than the sealing part by using a masking unit; and
forming a skin layer of the sealing part, the skin layer being in a non-foamed state by heating and vulcanizing a surface of the treatment liquid, and forming a sponge layer of the sealing part by vulcanizing and foaming the non-vulcanized and non-foamed rubber that is internal from the skin layer by passing the intermediate molded body through a heating zone,
wherein the masking unit comprises a wall part disposed between parts other than the sealing part of the intermediate molded body and the spraying unit so that the parts other than the sealing part are shielded from the spraying unit.

\* \* \* \* \*